(12) United States Patent
Jain et al.

(10) Patent No.: US 8,682,637 B2
(45) Date of Patent: Mar. 25, 2014

(54) SYSTEM, METHOD AND COMPUTER PROGRAM PRODUCT FOR COMPARING RESULTS OF PERFORMING A PLURALITY OF OPERATIONS WITH RESULTS OF SIMULATING THE PLURALITY OF OPERATIONS

(75) Inventors: Punit Jain, Cupertino, CA (US);
Yongsheng Wu, Palo Alto, CA (US);
Yanik Grignon, Newton, MA (US);
Shitij Agarwal, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 558 days.

(21) Appl. No.: 12/978,363

(22) Filed: Dec. 23, 2010

(65) Prior Publication Data

US 2011/0264434 A1  Oct. 27, 2011

Related U.S. Application Data

(60) Provisional application No. 61/327,607, filed on Apr. 23, 2010.

(51) Int. Cl.
*G06F 9/45* (2006.01)

(52) U.S. Cl.
USPC ............ 703/22; 703/13; 703/14; 703/15; 707/690; 725/92; 725/98; 725/2; 725/87

(58) Field of Classification Search
None
See application file for complete search history.

(56) References Cited

U.S. PATENT DOCUMENTS

| 7,209,929 | B2 | 4/2007 | Dominguez, Jr. et al. |
| 7,698,160 | B2 | 4/2010 | Beaven et al. |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,275,836 | B2 | 9/2012 | Beaven et al. |
| 2002/0059618 | A1* | 5/2002 | Venter ........................ 725/87 |
| 2003/0233404 | A1* | 12/2003 | Hopkins ..................... 709/203 |
| 2005/0065925 | A1 | 3/2005 | Weissman et al. |
| 2005/0223022 | A1 | 10/2005 | Weissman et al. |
| 2005/0283478 | A1 | 12/2005 | Choi et al. |
| 2006/0037037 | A1* | 2/2006 | Miranz ......................... 725/2 |
| 2006/0206834 | A1 | 9/2006 | Fisher et al. |
| 2009/0254952 | A1* | 10/2009 | Sridhar et al. ............... 725/92 |
| 2009/0290012 | A1* | 11/2009 | Ma et al. .................. 348/14.08 |
| 2010/0146569 | A1* | 6/2010 | Janardhan et al. ........... 725/98 |
| 2011/0069178 | A1* | 3/2011 | Harris ........................ 348/181 |

OTHER PUBLICATIONS

Craig S. Freeman, David J. DeWitt the SPIFFI Scalable Video-on-Demand System SCM 0-89791-731-6/95/0005, 1996.*
Matthew R. Lehr, Young-Kuk Kim, Sang H. Son Managing Contention and Timing Constraints in a Real-Time Database System 1052-8725/95, IEEE, 1995.*
U.S. Appl. No. 60/828,192, filed Oct. 4, 2006.
U.S. Appl. No. 12/977,012, filed Dec. 22, 2010.

* cited by examiner

*Primary Examiner* — Saif Alhija
*Assistant Examiner* — Cuong Luu
(74) *Attorney, Agent, or Firm* — Zilka-Kotab, PC (57) ABSTRACT

In accordance with embodiments, there are provided mechanisms and methods for comparing results of performing a plurality of operations with results of simulating the plurality of operations. These mechanisms and methods for comparing results of performing a plurality of operations with results of simulating the plurality of operations can enable optimized performance of operations, reduced processing time, increased confidence in processing results, etc.

17 Claims, 4 Drawing Sheets

SYSTEM, METHOD AND COMPUTER PROGRAM PRODUCT FOR COMPARING RESULTS OF PERFORMING A PLURALITY OF OPERATIONS WITH RESULTS OF SIMULATING THE PLURALITY OF OPERATIONS

CLAIM OF PRIORITY

This application claims the benefit of U.S. Provisional Patent Application 61/327,607, entitled "Methods and systems for testing locks in a multi-tenant database system," by Jain et al., filed Apr. 23, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to performing operations on an entity, and more particularly to analyzing results of performing the operations.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Performing one or more operations is a common practice of conventional systems. For example, a plurality of operations may be performed within an organization of a multi-tenant on-demand database system. Unfortunately, operation performance techniques have been associated with various limitations.

Just by way of example, traditional methods of performing operations within a system may only allow a single operation to be performed at a particular point in time. For example, operations that interfere with other operations when they are performed (e.g., by using data that is also used by other operations, etc.) may be performed in a mutually exclusive manner in order to prevent problems with data associated with the operations (e.g., data corruption, etc.). Additionally, traditional methods of performing operations within a system may not be analyzed in order to confirm that the operations were performed correctly. Accordingly, it is desirable to provide techniques that improve data transmission between systems.

BRIEF SUMMARY

In accordance with embodiments, there are provided mechanisms and methods for comparing results of performing a plurality of operations with results of simulating the plurality of operations. These mechanisms and methods for comparing results of performing a plurality of operations with results of simulating the plurality of operations can enable optimized performance of operations, reduced processing time, increased confidence in processing results, etc.

In an embodiment and by way of example, a method for comparing results of performing a plurality of operations with results of simulating the plurality of operations is provided. In one embodiment, results of simulating a plurality of operations on an entity of a system in a first manner are determined. Additionally, results of performing the plurality of operations on the entity of the system in a second manner are determined. Further, one or more actions are performed based on a comparison of the results of the performing with the results of the simulating.

While one or more implementations and techniques are described with reference to an embodiment in which comparing results of performing a plurality of operations with results of simulating the plurality of operations is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for comparing results of performing a plurality of operations with results of simulating the plurality of operations.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for comparing results of performing a plurality of operations with results of simulating the plurality of operations will be described with reference to example embodiments.

Figure 1:
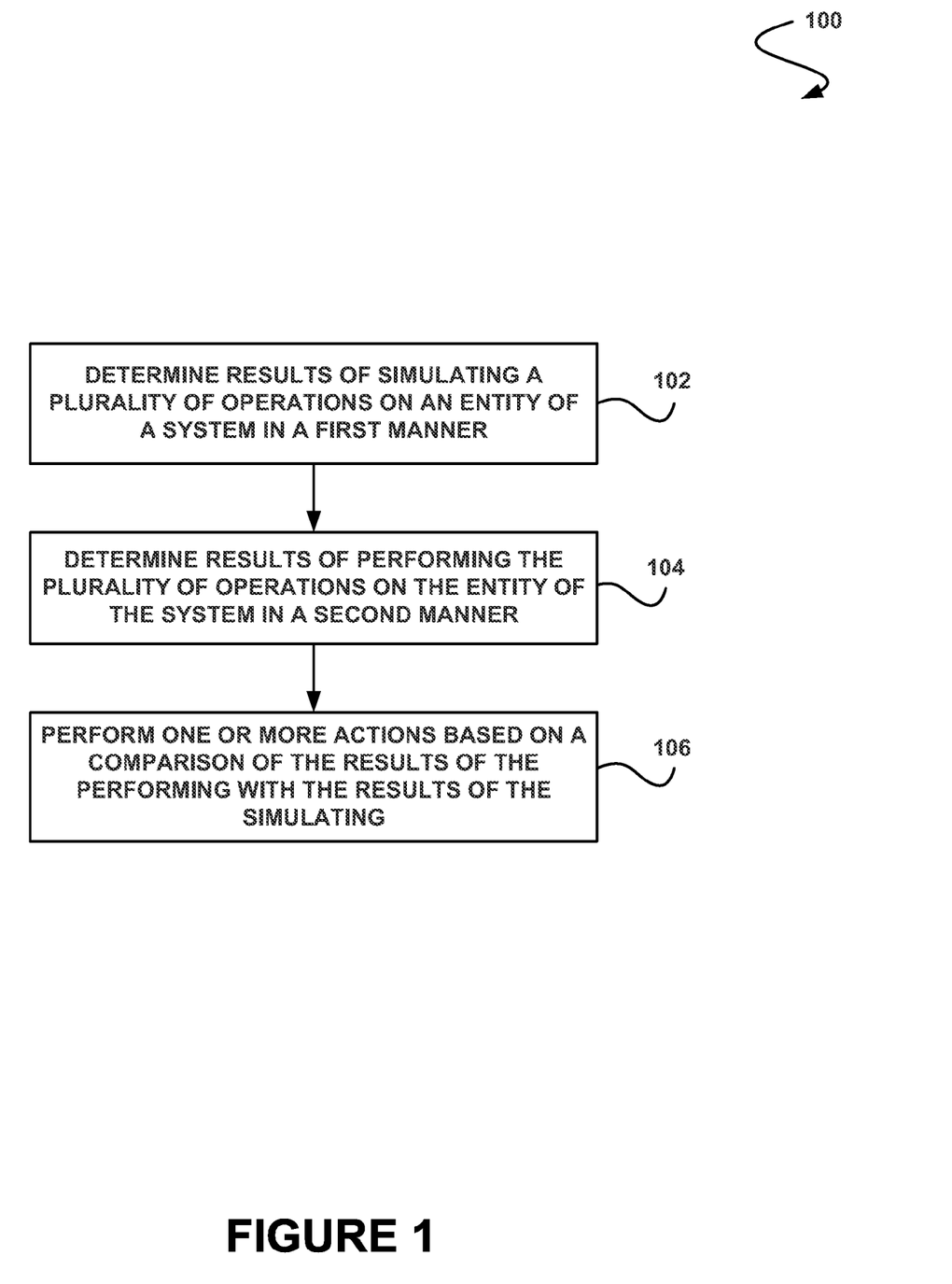
FIG. 1 illustrates a method for comparing results of performing a plurality of operations with results of simulating the plurality of operations, in accordance with one embodiment.

FIG. 1 illustrates a method 100 for comparing results of performing a plurality of operations with results of simulating the plurality of operations, in accordance with one embodiment. As shown in operation 102, results of simulating a plurality of operations on an entity of a system in a first manner are determined. In one embodiment, the system may include any system that includes one or more entities. For example, the system may include a server, a client, a multi-tenant on-demand database system, etc. In another embodiment, the entity may include any element of the system (e.g., an organization of the system, etc.).

Additionally, in another embodiment, the simulating may be performed by an application. For example, the simulating may be performed by a generator application, etc. In yet another embodiment, the application may be located within the system, outside of the system, etc. Further, in one embodiment, the simulating may be performed in memory. Further still, in another embodiment, the plurality of operations may include any operation associated with the entity of the system. For example, the plurality of operations may include one or more of user operations within the entity, group membership operations within the entity, portal operations within the entity, hierarchy operations within the entity, etc. In yet another embodiment, the plurality of operations may include operations that interfere with other operations. For example, one or more of the plurality of operations may utilize resources (e.g., data, etc.) that are also utilized by another of the plurality of operations. In another embodiment, one or more of the plurality of operations may utilize a lock with respect to the entity. For example, one or more of the plurality of operations may use an entity lock in order to prevent race conditions during the performance of an operation on the entity.

Also, in one embodiment, the plurality of operations may be simulated according to a configuration file. For example, a configuration file may be received at an application, and may define a number of general tasks to be performed on the entity. Additionally, based on the tasks in the configuration file, the application may determine specific operations to be performed on the entity in order to complete the tasks. Further, in another embodiment, simulating the plurality of operations in the first manner may include simulating the plurality of operations sequentially. For example, the performance of the plurality of operations may be simulated in a single threaded manner (e.g. in a mutually exclusive manner), etc.

Further, in another embodiment, the results of the simulating may be determined by tracking the results of the simulating of each of the plurality of operations. For example, the results of the simulating may include a memory representation of the entity of the system which may be updated as each of the plurality of operations is simulated on the entity. Further still, in yet another embodiment, the results of the simulating may include one or more dependencies between the plurality of operations which may be tracked during the simulating. Also, in still another embodiment, the results of the simulating may include an expected final state of the entity after the plurality of operations has been performed.

Additionally, in one embodiment, the results of the simulating of the plurality of operations may include one or more files. For example, the simulating of the plurality of operations may produce a file describing operations to be performed on the entity, dependencies between those operations, etc. In another embodiment, the simulating of the plurality of operations may produce a file describing the expected final state of the entity after the plurality of operations has been performed. For example, the simulating of the plurality of operations may produce a file describing the expected final state of one or more database tables associated with the entity.

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Furthermore, as shown in operation 104, results of performing the plurality of operations on the entity of the system in a second manner are determined. In one embodiment, the performing may be accomplished by an application. For example, the plurality of operations may be performed on the entity by an executor application, etc. Again, in one embodiment, the application may be located within the system, outside of the system, etc.

Additionally, in another embodiment, performing the plurality of operations in the second manner may include performing one or more of the plurality of operations in parallel. For example, one or more of the plurality of operations may be performed concurrently, etc. Further, in yet another embodiment, the plurality of operations may be performed on the entity according to one or more files produced during the simulating. For example, a file describing operations to be performed on the entity that is produced during the simulating may read by an application, and such operations may then be performed on the entity.

Further, in one embodiment, performing the plurality of operations may include sorting the plurality of operations. For example, a topological sort may be run on the plurality of operations in order to determine one or more operations that can currently be run (e.g., operations that don't have any dependency, operations that have amenities that have been satisfied, etc.). In another embodiment, performing the plurality of operations may include creating a plurality of threads. For example, performing the plurality of operations may include creating a plurality of threads to perform operations to be performed on the entity.

Also, in yet another embodiment, the results of performing the plurality of operations may be determined by logging data during the performing. For example, the results of performing the plurality of operations may include data associated with an operation being processed (e.g., a start time, end time, operation ID, etc.) as well as data associated with the failure of an operation (e.g., time, operation ID, type of lock that failed to be acquired, etc.) which may be logged when the plurality of operations are being performed. Additionally, in another embodiment, the results of the performing may include a final state of the entity of the system after the plurality of operations has been performed on the entity. For example, the results of the performing may include the final state of one or more database tables associated with the entity.

Additionally, a shown in operation 106, one or more actions are performed based on a comparison of the results of the performing with the results of the simulating. In one embodiment, the comparison may include comparing the expected final state of the entity determined during the simulating with the final state of the entity determined during the performing. For example, the comparison may include comparing the final state of one or more database tables associated with the entity determined during the simulating and determined during the performing. In another embodiment, if the comparison indicates that the final state of the entity does not match the expected final state of the entity, then a user may be alerted, one or more electronic mail messages may be sent (e.g., to an administrator, etc.), a summary of the plurality of the operations may be provided, etc.

In another embodiment, one or more errors associated with the performing of the plurality of operations may be determined. For example, instances in which a thread failed to acquire a lock may be determined and displayed. In another example, missing or additional rows in database tables associated with the entity may be determined and displayed. In yet another embodiment, it may be determined which of the plurality of operations caused bad data associated with the entity. In still another embodiment, any errors/bugs may be reproduced.

In this way, it may be determined whether the plurality of operations performed in the second manner was performed on the entity of the system correctly and without errors. Additionally, details associated with the performance of the plurality of operations in the second manner may be confirmed against details associated with the simulating of the plurality of operations in the first manner. Further, the validity of the entity after the plurality of operations is performed on it may be confirmed, thereby ensuring that database tables associated with the entity are not corrupted.

Figure 2:
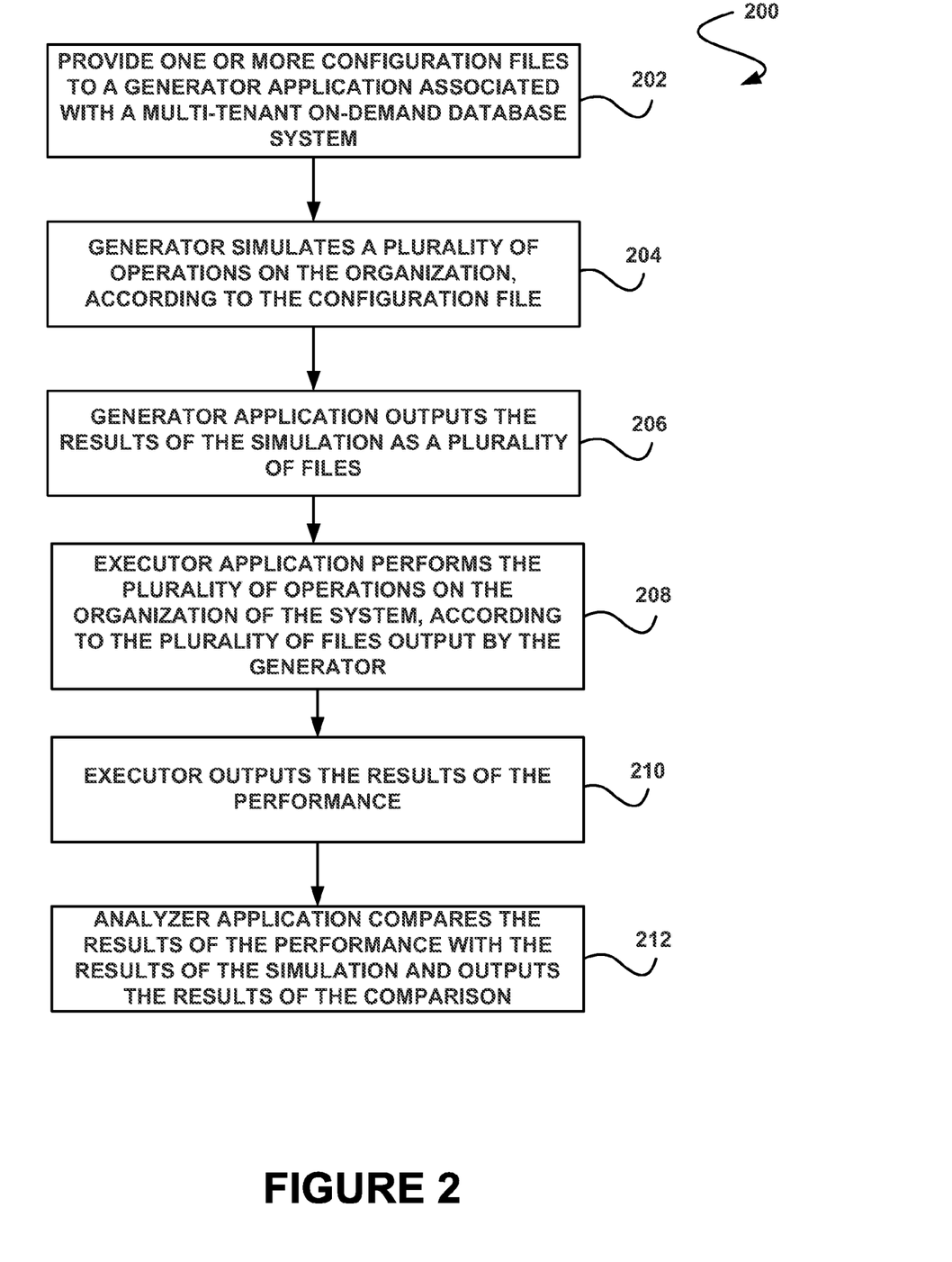
FIG. 2 illustrates a method for analyzing performance of an executor, in accordance with another embodiment.

FIG. 2 illustrates a method 200 for analyzing performance of an executor, in accordance with another embodiment. As an option, the present method 200 may be carried out in the context of the functionality of FIG. 1. Of course, however, the method 200 may be carried out in any desired environment. The aforementioned definitions may apply during the present description.

As shown in operation 202, one or more configuration files are provided to a generator application associated with a multi-tenant on-demand database system. In one embodiment, the configuration files may define a generic number of operations to be performed on an organization of the system (e.g., the creation of a new user within the organization, etc.). In another embodiment, the configuration files may contain a list of group membership operations with frequency. For example, an entry in the configuration file might be "Add User to Group 5." In another embodiment, the configuration file may also have the number of threads to be executed by an executor. In yet another embodiment, the organization may include a complex group membership data setup. For example, the organization may include a complex role hierarchy, users, public groups with complex membership, queues, personal groups, territories, portals, etc.

Additionally, as shown in operation 204, the generator simulates a plurality of operations on the organization, according to the configuration file. In one embodiment, the generator may determine the specific operations necessary to perform the generic operations described in the configuration file, For example, the generator may determine the specific operations necessary to create a new user in the organization, etc. In another embodiment, the generator may create a list of concrete operations to be executed on the DOT. For example, the operations may come from the configuration file. For instance, if a configuration file has "Add user to Group," the generator may add an entry "Add user U5 to Group G12."

In yet another embodiment, the generator may simulate the plurality of operations in memory. For example, the generator may start with a representation of an initial state of the organization in memory, and may simulate the plurality of operations on the representation of the organization in memory (e.g., by determining candidate items to perform the operations, performing the operations on a data structure in memory, etc), while tracking the state of the organization in memory. In another embodiment, the plurality of operations may be simulated sequentially. For example, in addition to generating the flow, the expected final state of the org may also be captured by performing each operation sequentially in memory. Additionally, in one embodiment, any dependencies between operations may also be tracked by the generator. This may ensure that all operations being performed are valid. It may also ensure a unique final state of the organization.

Further, as shown in operation 206, the generator application outputs the results of the simulation as a plurality of files. In one embodiment, the generator may output two extensible markup language (XML) files, where one XML file describes the operations simulated by the generator as well as any dependencies between operations, and the other XML file describes the final state of the organization after the operations (e.g., the expected result of the operations on the organization).

Further still, as shown in operation 208, an executor application performs the plurality of operations on the organization of the system, according to the plurality of files output by the generator. In one embodiment, the executor may perform the plurality of operations on the organization in a parallel (e.g., multi-threaded, concurrent, etc.) fashion. In another embodiment, if an operation cannot be done in parallel, the executor may re-queue the operation. Additionally, see, for example, U.S. patent application Ser. No. 12/977,012, filed Dec. 22, 2010, which is hereby incorporated by reference in its entirety, and which describes exemplary concurrent operation performance. Additionally, in one embodiment, the executor may invoke a number of group membership operations in parallel in a somewhat random fashion.

Also, in one embodiment, the executor may spawn a number of threads (e.g., 20 threads, a hundred threads, hundreds of threads, etc.) which may pick up jobs from the file created by the generator. In another embodiment, each job may be a group membership operation. In addition, in one embodiment, if a job depends on another job that has not been completed yet, the thread may pick up the dependent job instead. In another embodiment, if a thread fails to process a job due to failure of lock acquisition, it may be assigned a new random job and the failure may be logged. In still another embodiment, the execution may complete when operations have been executed.

In yet another embodiment, bottlenecks caused by the organization locks may be minimized. For example, instead of getting an organization wide lock that may prevent any of the operations in parallel, a more granular lock may be obtained that may allow certain operations to be performed in parallel. The locking may be done by a combination of row level locks, and dbms_locks. Table 1 illustrates examples of dbms locks that may be defined. Of course, it should be noted that the locks shown in Table 1 are set forth for illustrative purposes only, and thus should not be construed as limiting in any manner.

TABLE I

Exemplary List of Locks

| Lock Type | What it Controls |
|---|---|
| ROLE_HIERARCHY_REPARENT | Reparenting any role in the role hierarchy. |
| ROLE_HIERARCHY_DELETE | Deleting any role |
| ROLE_HIERARCHY_INSERT | Adding a new role |
| USER_ROLE_CHANGE | Changing the role of any user |
| <ROOT_ID>_TERRITORY_HIERARCHY_REPARENT | Reparenting any territory below the ROOT_ID |
| <ROOT_ID>_TERRITORY_HIERARCHY_DELETE | Deleting a territory below the ROOT_ID |
| <ROOT_ID>_TERRITORY_HIERARCHY_INSERT | Inserting a new territory anywhere below the ROOT_ID |
| USER_TERRITORY_INSERT | Adding new users to any territory |
| USER_TERRITORY_DELETE | Removing users from any territory |

In another embodiment, each of the locks may be obtained in shared or exclusive modes. Unlike roles and territories, groups may not have a common root. An organization may have many disconnected group sub-trees, and it may be possible to operate on these subtrees in parallel. In yet another embodiment, the individual group sub trees may be locked using row-level locks.

Table 2 illustrates an exemplary list of operations involved with organization locks. Of course, it should be noted that the operations shown in Table 2 are set forth for illustrative purposes only, and thus should not be construed as limiting in any manner.

TABLE 2

User operations

Create new User with role
Create No Role User
User Activation/Deactivation

*Public Group Membership operations*

Add user in root role to a group
Add user with no role to a group
Add user with non-root role to a group
Add roleAt/RoleDown/RoleDownInternal to a group
Add TerritoryAt/TerritoryDown to a group
Add group to another group
Remove user in root role from a group
Remove user with no role from a group
Remove user with non-root role from a group
Remove roleAt/RoleDown/RoleDownInternal from a group
Remove TerritoryAt/TerritoryDown from a group
Remove group from another group
Create a new group
Delete a group
Flip no bosses flag

*Public group without bosses*

Same as for regular groups but with flag flipped

*Queue Membership operations*

Same operations as Public group membership

*Role Hierarchy Operations*

Create a role
Delete a role
Re-parent a role
Change user role

*Portal Operations*

Create Portal User
Create new portal User under a portal account with no other portal users under it
Disable portal user
Portal Account Owner Change

TABLE 2-continued

Merge Portal Accounts
Person Account Owner Change
Change portal user role under a different account
Change parent account of a portal user contact

*Territory Hierarchy Operations*

Enable TM from role hierarchy
Create a territory
Delete a territory
Re-parent a territory
Add user to Territory
Remove user from Territory
Assign account with opp where opp owned by user not in territory

*Recalculation*

Group Membership Recalc from BT

*Sharing Rules*

Create sharing rule where source or target group is not populated

Also, as shown in operation 210, the executor outputs the results of the performance. For example, the executor may output a final state of the organization after the plurality of operations has been performed on the organization. In one embodiment, the executor may log information when the operations are being processed. For example, the executor may log the start time, end time, and operation Id being processed by each thread. In another example, the executor may log the time, operation Id and lock type in the event a job fails due to failure to acquire a lock. It may also log other operations that were running concurrently which may help validate if the operation should in fact have failed due to lock acquisition error.

Additionally, as shown in operation 212, an analyzer application compares the results of the performance with the results of the simulation and outputs the results of the comparison. For example, if the analyzer determined that there are no differences between the results of the performance and the results of the simulation, then the analyzer may output a notification that the results are as expected.

In one embodiment, once all threads have completed processing, the analyzer may compare the final state of the org with the expected state saved earlier. The analyzer may also look at all instances where a thread failed to acquire a lock. In addition, the analyzer may run scrutinies to find any missing/extra rows in group membership tables. Further, for any bad data introduced, the analyzer may determine which operation caused it. Further still, the analyzer may reproduce the bug. Also, the analyzer may also check that the right locks are being taken out for each operation. In one embodiment, the analyzer may not validate automatically whether the correct set of locks were taken out by each operation. In case scrutinizes find bad data it may imply that not enough locks were taken out by some operation. The logs written by the validator may help validate whether lock acquisition failures were valid.

In addition, in one embodiment, the analyzer may determine whether one or more criteria were met. For example, the analyzer may determine whether all group membership operations took out the new locks and row level locks. In another example, the analyzer may determine whether each operation takes out the locks it is supposed to. In yet another example, the analyzer may determine whether multiple operations requiring different set of locks were processed in parallel. Additionally, in one example, the analyzer may determine whether multiple operations requiring same locks in shared mode were processed in parallel. In one embodiment, the analyzer may not do this automatically, but this may be done by inspection of the logs and scrutiny results.

Further, in another example, the analyzer may determine whether an operation requiring exclusive lock failed if the lock is held by another process. In yet another example, the analyzer may also determine whether an operation requiring a shared lock failed if an exclusive lock is held by another process. In still another example, the analyzer may determine whether a lock is released after the process has completed, whether an operation fails gracefully if it cannot acquire a lock, etc. In another embodiment, the analyzer may not determine this automatically, but this may be done by inspection of the logs and scrutiny results.

In another embodiment, it may be determined whether each operation takes out a correct set of locks. For example, a test may be performed that holds a lock and performs all group membership operations. Additionally, in one embodiment, the set of operations that fail due to the lock acquisition may be checked, as well as the set of operations that pass. Further, the lock may then be released and it may be asserted (e.g., output as a message, etc.) that all operations complete successfully. In yet another embodiment, these tests may be run for each lock in both exclusive and shared mode.

Further still, in one embodiment, the performance of the executor may be tested in multiple ways (e.g., with a fuzzy testing framework, with a deterministic suite of tests, etc). For example, the deterministic tests may test whether a specific operation takes out certain locks and not others. In another example, the test may be meant to be a limited set of representative test cases, derived from the basic list of operations which require locks. In another embodiment, these test cases may be developed under one or more assumptions.

For example, it may be assumed that group membership row locking is independent of organization locking and can be tested separately. Therefore group locking may be tested separately from organization locking. Additionally, with respect to a user, it may be assumed that locking does not depend on which type of portal a user is operated on. Therefore it may be assumed that csp is equal to partner user type for test cases. Further, in another embodiment, users may be binned into the following areas that matter—top role user, non-top role user, no role user, LPU (HVPU), etc.

In yet another embodiment, it may be assumed that adding anything (i.e. RoleAt, etc.) to a group may be the same thing as adding a group with that entity (ie RoleAt) to a group in terms of locks. Additionally, these test cases may be collapsed. Further, with respect to roles, it may be assumed that ILocking for RoleDown and RoleDownInternal is the same. Further still, in still another embodiment, with respect to System Groups, it may be assumed that because locking code depends on group types, all three system groups may be treated the same (e.g., all Internal Users, all Customer Portal Users, all Partner Users, etc.).

Also, in one embodiment, with respect to roles, it may be assumed that it does not matter whether a role is a portal role or not. Additionally, in another embodiment, it may be assumed that batch calls may go through the same code as non batch. For example, exhaustive batch suite may supersede single test cases.

System Overview

Figure 3:
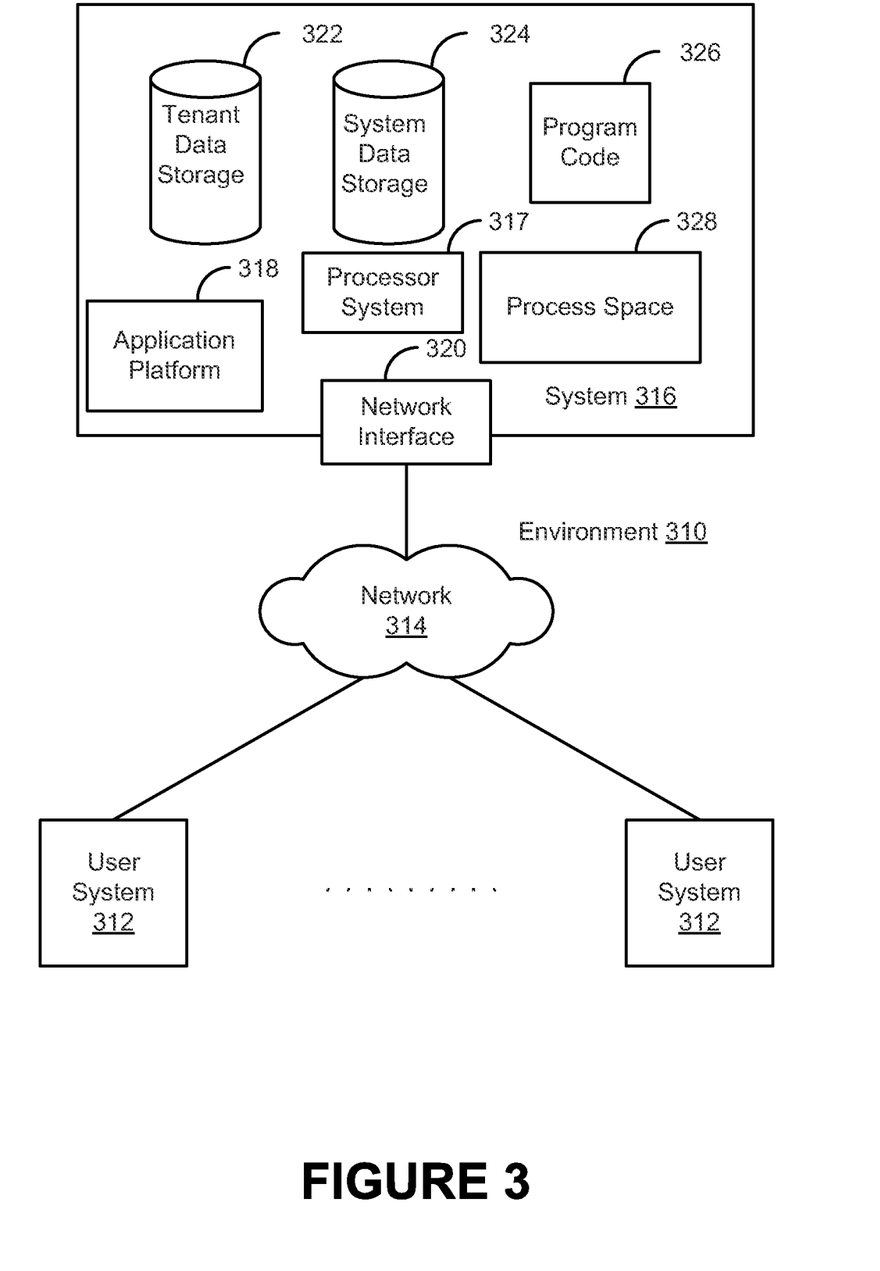
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network. 314 with an on-demand database system, which is system 316.

An on-demand database system, such as system 316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAR-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.)

using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
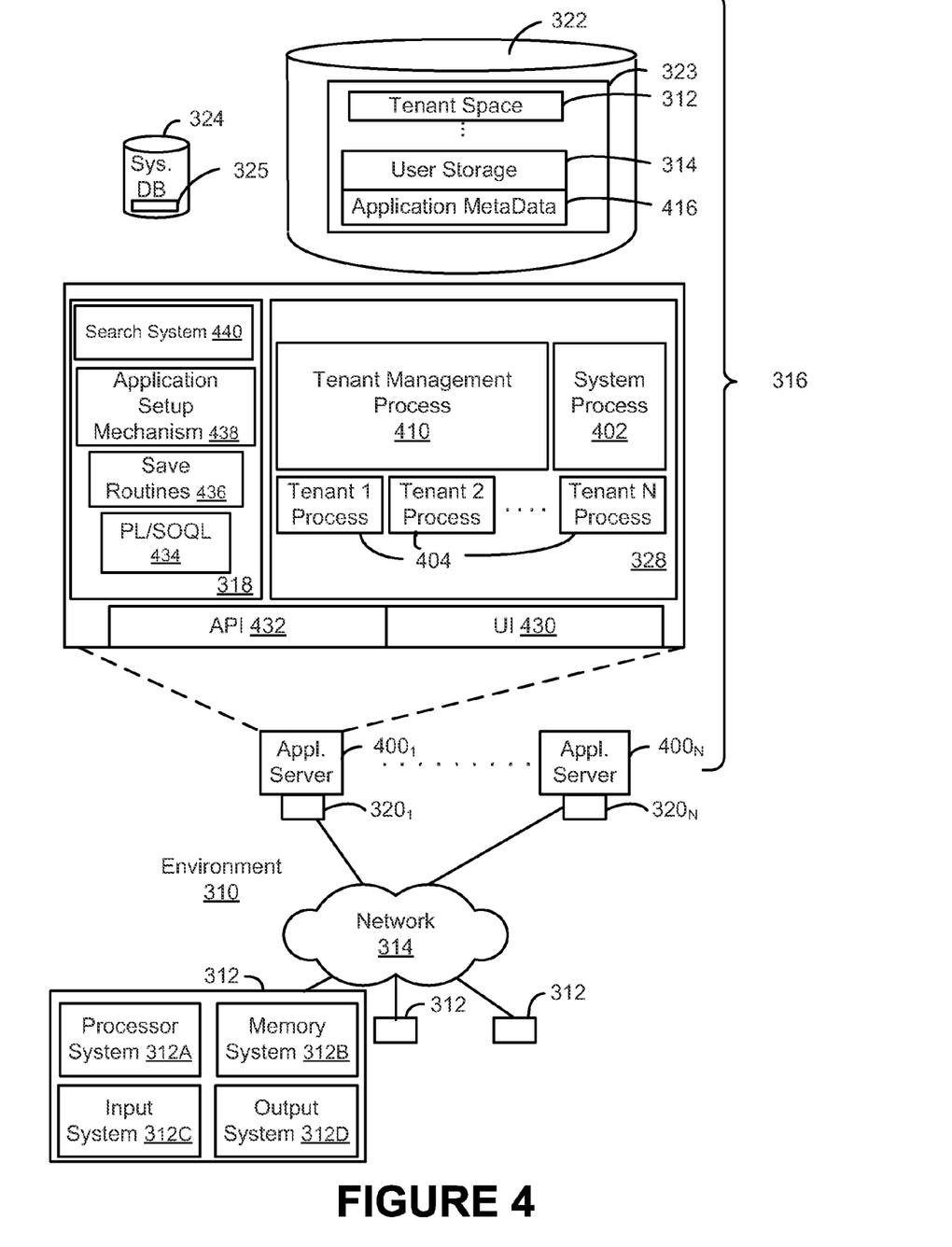
FIG. 4 illustrates a block diagram of an embodiment of elements of FIG. 4 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example, Invocations to such applications may be coded using PL/SOQL 434 that provides a programming language style interface extension to API 432. A detailed description of some PL/SOQL, language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

in certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a non-transitory computer readable medium, comprising:
   computer code for determining results of simulating a plurality of operations on an entity of a system in a sequential manner, where the results include an expected final state of one or more database tables within the system after the plurality of operations have been performed sequentially;
   computer code for determining results of performing the plurality of operations on the entity of the system in a parallel manner, where the results include an actual final state of the one or more database tables within the system after the plurality of operations have been performed in parallel;
   computer code for determining whether the expected final state of the one or more database tables matches the actual final state of the one or more database tables; and
   computer code for performing one or more actions if it is determined that the expected final state of the one or more database tables does not match the actual final state of the one or more database tables, where the one or more actions include one or more of alerting a user, sending one or more electronic mail messages, and providing a summary of the plurality of operations.

2. The computer program product of claim 1, wherein the system includes a multi-tenant on-demand database system.

3. The computer program product of claim 1, wherein the entity includes an organization of the system.

4. The computer program product of claim 1, wherein the simulating is performed in memory.

5. The computer program product of claim 1, wherein the plurality of operations include one or more of user operations within the entity, group membership operations within the entity, portal operations within the entity, and hierarchy operations within the entity.

6. The computer program product of claim 1, wherein the plurality of operations include operations that interfere with other operations.

7. The computer program product of claim 1, wherein the computer program product is operable such that one or more of the plurality of operations utilize a lock with respect to the entity.

8. The computer program product of claim 1, wherein the plurality of operations is simulated according to a configuration file.

9. The computer program product of claim 8, wherein the configuration file defines a number of general tasks to be performed on the entity.

10. The computer program product of claim 1, wherein the computer program product is operable such that the results of the simulating include a memory representation of the entity of the system which is updated as each of the plurality of operations is simulated on the entity.

11. The computer program product of claim 1, wherein the simulating of the plurality of operations produces a file describing operations to be performed on the entity.

12. The computer program product of claim 1, wherein the simulating of the plurality of operations produces a file describing the expected final state of the entity after the plurality of operations has been performed.

13. The computer program product of claim 1, wherein the computer program product is operable such that the plurality of operations are performed on the entity according to one or more files produced during the simulating.

14. The computer program product of claim 1, wherein the results of performing the plurality of operations are determined by logging data during the performing.

15. A method, comprising:
    determining results of simulating a plurality of operations on an entity of a system in a sequential manner, where the results include an expected final state of one or more database tables within the system after the plurality of operations have been performed sequentially;
    determining results of performing the plurality of operations on the entity of the system in a parallel manner, where the results include an actual final state of the one or more database tables within the system after the plurality of operations have been performed in parallel;
    determining whether the expected final state of the one or more database tables matches the actual final state of the one or more database tables; and
    performing one or more actions if it is determined that the expected final state of the one or more database tables does not match the actual final state of the one or more database tables, utilizing a processor, where the one or more actions include one or more of alerting a user, sending one or more electronic mail messages, and providing a summary of the plurality of operations.

16. An apparatus, comprising:
    a processor for:
    determining results of simulating a plurality of operations on an entity of a system in a sequential manner, where the results include an expected final state of one or more database tables within the system after the plurality of operations have been performed sequentially;
    determining results of performing the plurality of operations on the entity of the system in a parallel manner, where the results include an actual final state of the one or more database tables within the system after the plurality of operations have been performed in parallel;
    determining whether the expected final state of the one or more database tables matches the actual final state of the one or more database tables; and
    performing one or more actions if it is determined that the expected final state of the one or more database tables does not match the actual final state of the one or more database tables, where the one or more actions include one or more of alerting a user, sending one or more electronic mail messages, and providing a summary of the plurality of operations.

17. The computer program product of claim 1, wherein simulating the plurality of operations on the entity of the system in a sequential manner includes creating in memory a representation of the entity of the system and simulating sequentially the plurality of operations on the representation of the entity in the memory while tracking a state of the entity in the memory.

* * * * *